(12) United States Patent
Chen

(10) Patent No.: US 7,539,524 B2
(45) Date of Patent: May 26, 2009

(54) MOBILE COMMUNICATION DEVICE WITH ROTATING MEMBER

(75) Inventor: Hung-Chang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 584 days.

(21) Appl. No.: 11/395,312

(22) Filed: Apr. 3, 2006

(65) Prior Publication Data
US 2007/0232243 A1 Oct. 4, 2007

(51) Int. Cl.
*H04B 1/38* (2006.01)
*H04B 7/00* (2006.01)
*H04M 1/00* (2006.01)

(52) U.S. Cl. .................. 455/575.1; 455/90.3; 455/565

(58) Field of Classification Search ............. 455/575.1, 455/550.1, 90.1, 90.3, 564, 565, 566; 379/433, 379/433.04

See application file for complete search history.

(56) References Cited

U.S. PATENT DOCUMENTS

| | | | | |
|---|---|---|---|---|
| 5,436,954 A | * | 7/1995 | Nishiyama et al. | 455/566 |
| 5,742,912 A | * | 4/1998 | Nishiyama et al. | 455/566 |
| 5,841,849 A | * | 11/1998 | Macor | 379/142.17 |
| 6,094,586 A | * | 7/2000 | Nishiyama et al. | 455/566 |
| 6,334,049 B1 | * | 12/2001 | Nishiyama et al. | 455/566 |
| 6,564,075 B1 | * | 5/2003 | Mitamura | 455/575.1 |
| 7,400,915 B2 | * | 7/2008 | Wong et al. | 455/575.3 |

* cited by examiner

*Primary Examiner*—Tilahun Gesesse
(74) *Attorney, Agent, or Firm*—Bacon & Thomas, PLLC

(57) ABSTRACT

The present invention is to provide a mobile communication device, which comprises a rotating member; a housing including a recessed hole having a circular opening on a surface of the housing wherein the hole is dimensioned to fit the rotating member therein with a portion of the rotating member projected from the housing; and one or more detectors provided in the hole of the housing facing the rotating member, the detectors having upper portions in rotational contact with the rotating member and lower portions electrically connected to a circuit board. In response to rotating the rotating member a movement signal representing the rotational movement of the rotating member is generated by the detectors; and the movement signal is adapted to convert into an instruction useable to move an object on a top display of the mobile communication device.

9 Claims, 6 Drawing Sheets

US 7,539,524 B2

MOBILE COMMUNICATION DEVICE WITH ROTATING MEMBER

FIELD OF THE INVENTION

The present invention relates to mobile communication devices and more particularly to such a mobile communication device (e.g., mobile phone) having a rotating member (e.g., trackball) enabling a user to conveniently and easily input a direction instruction as desired.

BACKGROUND OF THE INVENTION

Both information technology and communication technology have known a rapid, spectacular development in recent several decades. An era of information and electronics thus has come. A variety of mobile communication devices developed by taking advantage of the technology of calculator are closely related to our daily life. Many different types of mobile communication device (e.g., mobile phone, PDA (Personal Digital Assistant), etc.) are very popular and are frequently used by people. Also, mobile communication device market is very competitive. Moreover, many manufacturers of the art endeavor to own a big share of the market. Thus, a wide variety of advanced mobile communication products are produced by major mobile communication product manufacturers in a faster pace. These products are characterized by being novel, compact, multi-functional, etc. so as to attract more consumers. In response, people have an increasing demand to the features and quality of the mobile communication products. Hence, a desired mobile communication product in the future should have advanced features, be aesthetic in its appearance, and satisfy consumer's service needs and these goals are not easy to obtain.

Mobile phones have been available for a time. A typical mobile phone 100 is shown in FIG. 1 and comprises a display 110 and a cross-shaped key 150 below the display 110. A user may manipulate the key 150 to select an option on a menu of the mobile phone 100. A mobile phone 100 typically has many useful functions and is able to provide many convenient services to users so as to solve many inconvenient things occurred in our daily life. Thus, mobile phones have become a ubiquitous tool for both personal and work related tasks. Conventionally, these functions and services are shown on the display 110 through a GUI (Graphic User Interface). Thus, a user may press the cross-shaped key 150 to select an icon representing one of the functions and services to activate same. Alternatively, another typical mobile phone 100 is illustrated in FIG. 2. The mobile phone 100 has a plurality of numeric keys 200 as a replacement of the cross-shaped key 150 in which "2", "4", "6", and "8" keys are served as direction keys for changing direction when a video game is playing.

However, a user may have the experience of being incapable of precisely positioning a cursor on a desired location on the display by pressing either the cross-shaped key 150 or the numeric keys 200 by a finger. This is inconvenient. Further, a user may feel muscles sore and stiff when a frequent use of either the cross-shaped key 150 or the numeric keys 200 is required (e.g., in playing a video game). Thus, it is desirable among mobile communication product designers and manufacturers of the art to provide a mobile communication device with a rotating member such that a user may conveniently, easily manipulate direction by rotating the rotating member in order to overcome the inadequacies of the prior art.

SUMMARY OF THE INVENTION

After considerable research and experimentation, a mobile communication device having a rotating member according to the present invention has been devised so as to overcome the above drawbacks of the prior art.

It is an object of the present invention to provide a mobile communication device comprising a rotating member; a housing including a recessed hole having a circular opening on a surface of the housing wherein the hole is dimensioned to fit the rotating member therein with a portion of the rotating member projected from the housing; and one or more detectors provided in the hole of the housing facing the rotating member, the detectors having upper portions in rotational contact with the rotating member and lower portions electrically connected to a circuit board. In response to rotating the rotating member a movement signal representing the rotational movement of the rotating member is generated by the detectors; and the movement signal is adapted to convert into an instruction useable to move an object on a top display of the mobile communication device. By utilizing this mobile communication device, a user may conveniently, easily input a direction instruction as desired.

It is another object of the present invention to provide a push button on the circuit board proximate a position to be in contact with the rotating member. The push button has a top in contact with the rotating member and a bottom affixed onto the circuit board. A pressing of the push button by the rotation of the rotating member will generate a pressing signal. Further, a user is allowed to input a signal to control the mobile communication device.

The above and other objects, features and advantages of the present invention will become apparent from the following detailed description taken with the accompanying drawings.

DETAILED DESCRIPTION OF THE PREFERRED EMBODIMENTS

Figure 1:
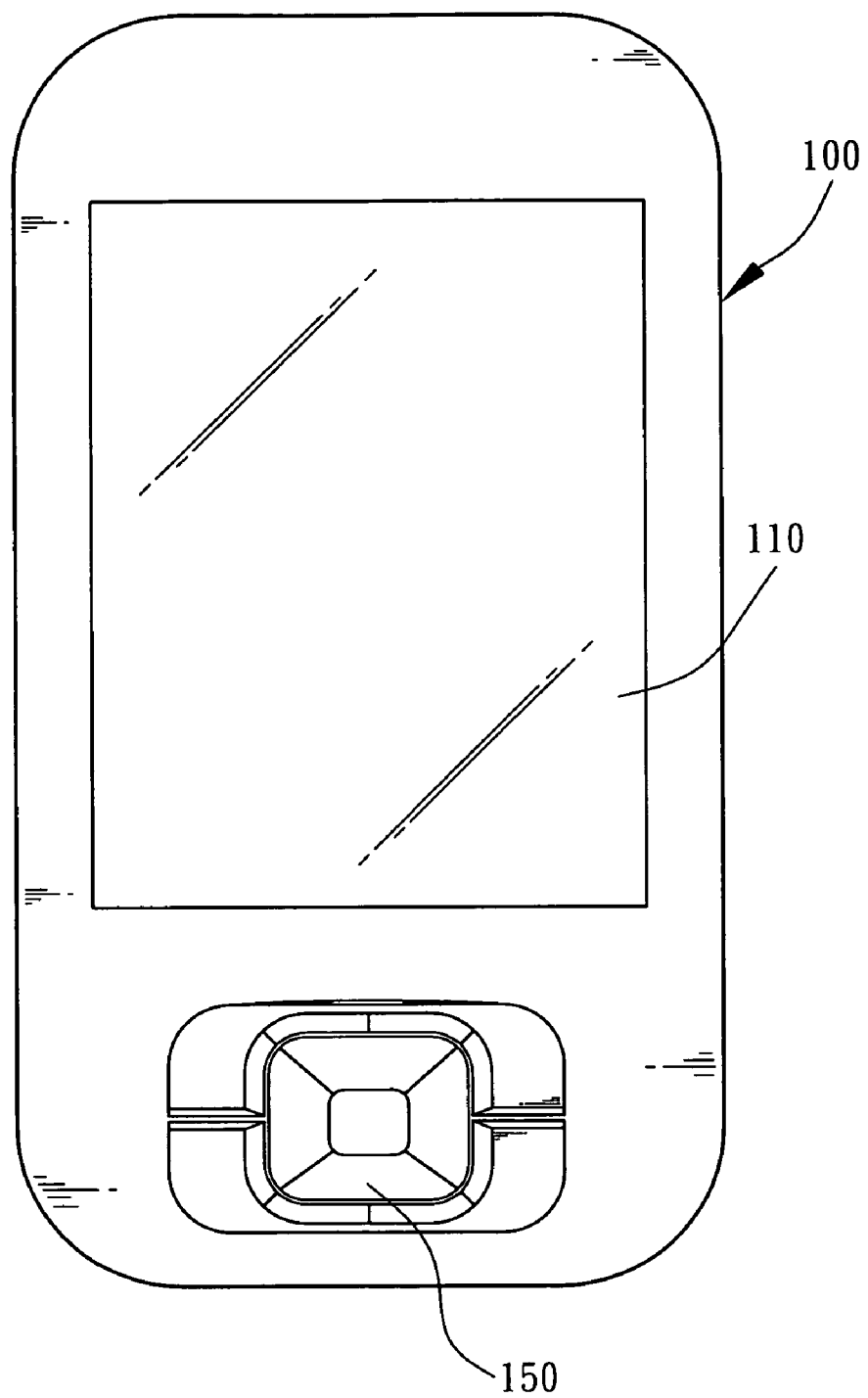
FIG. 1 is a top plan view of a conventional mobile phone having a cross-shaped key as a direction key.
Figure 2:
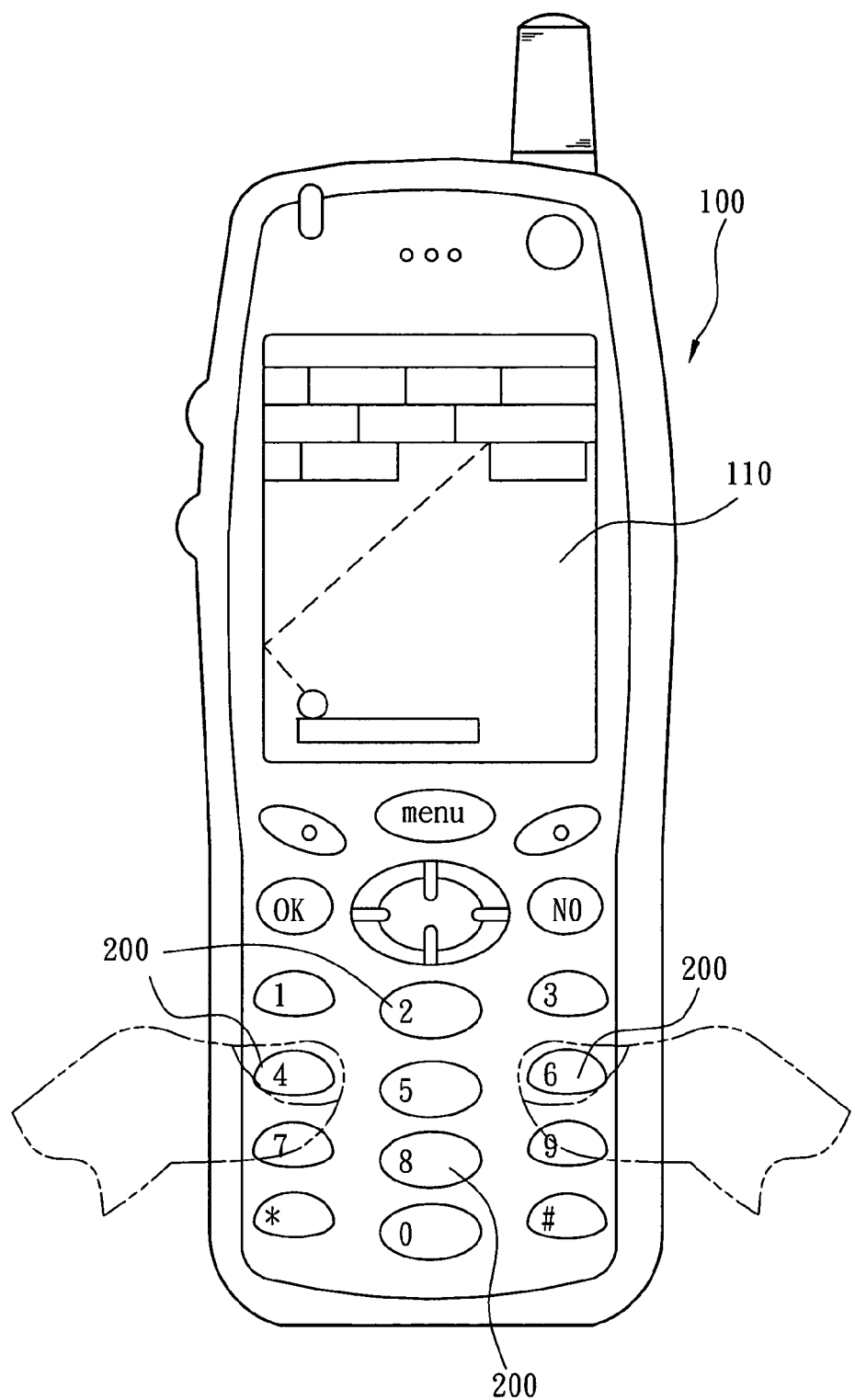
FIG. 2 is a top plan view of another conventional mobile phone having numeric keys as direction keys.
Figure 3:
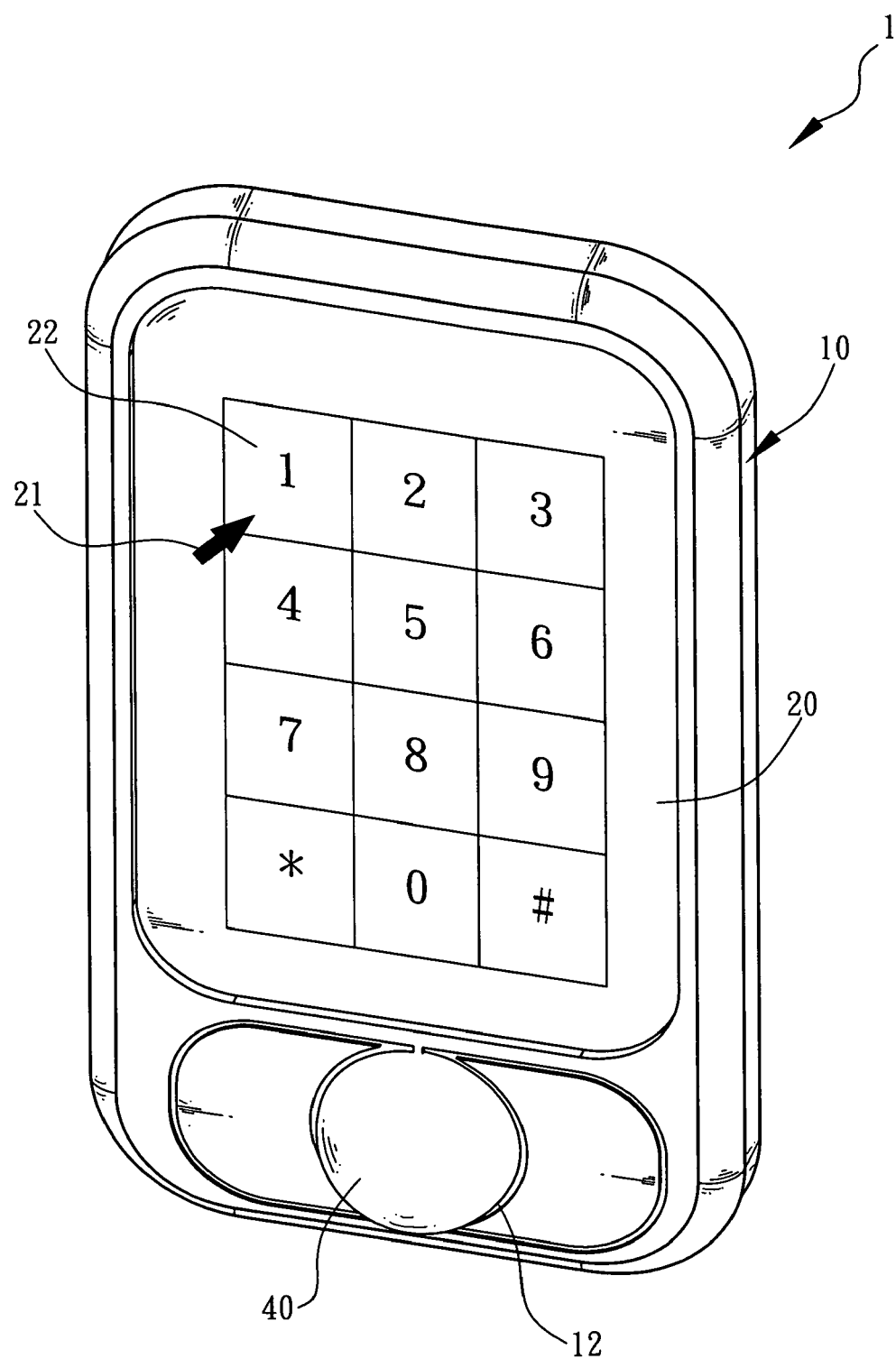
FIG. 3 is a perspective view of a first preferred embodiment of mobile communication device according to the invention.
Figure 4:
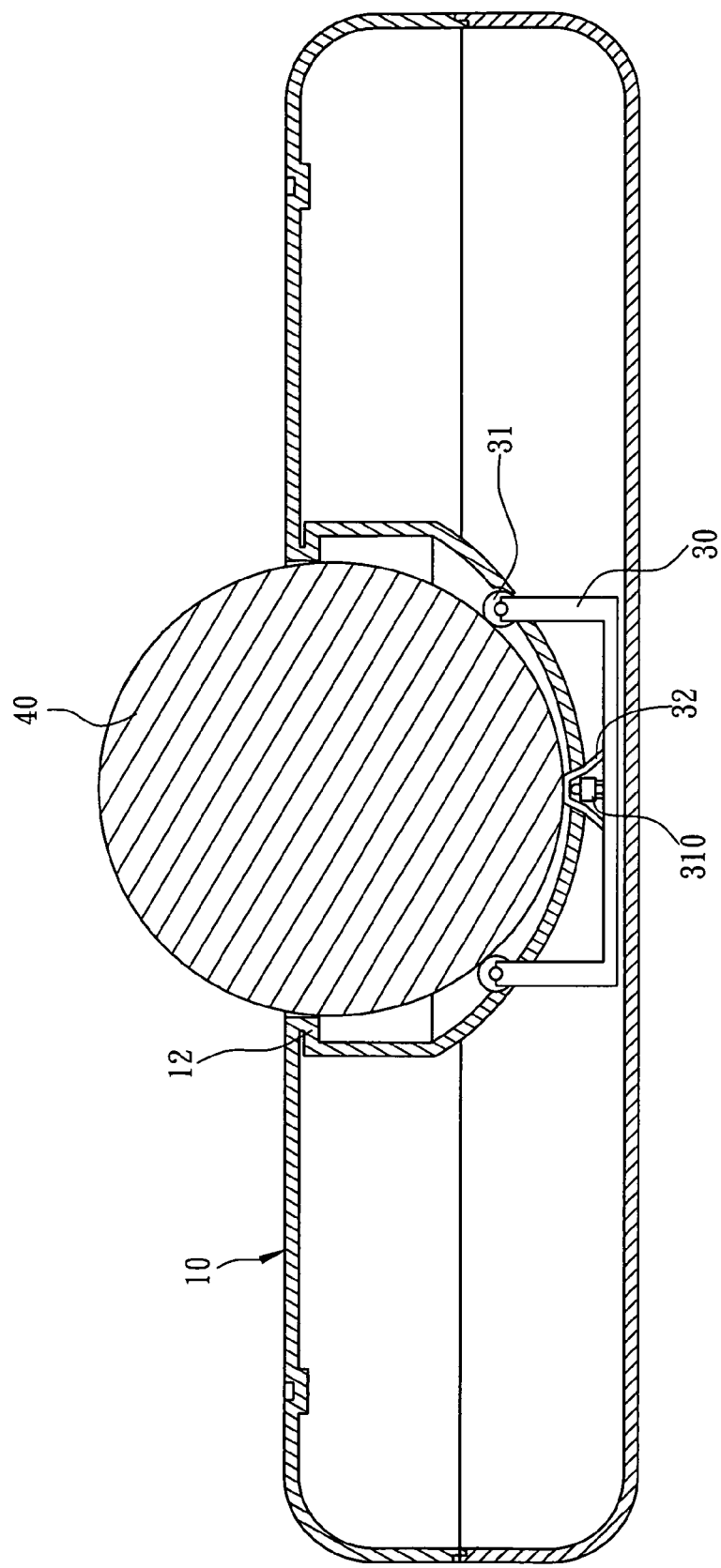
FIG. 4 is a sectional view of the rotating member and adjacent components of the mobile communication device in FIG. 3.

Referring to FIGS. 3 and 4, a mobile communication device 1 with a rotating member 40 in accordance with a first preferred embodiment of the invention is shown. The mobile communication device 1 comprises a housing 10. A circuit board 30 is provided within the housing 10. A recessed hole 12 having a circular opening is formed in the housing 10. The size of the hole 12 is dimensioned to fit the rotating member 40 therein with a portion of the rotating member 40 projected from the housing 10. As such, a user may freely rotate the rotating member 40 as desired. At least one detector 31 is provided on a bottom of the hole 12 in the housing 10 facing the rotating member 40. A push button 32 is provided on the bottom of the hole 12 in close proximity with the rotating member 40 (i.e., proximate a position to be in contact with the rotating member 40). A pad 310 is provided between the push button 32 and the rotating member 40. A top of the pad 310 and upper portions of the detectors 31 are in contact with the rotating member 40. A bottom of the pad 310 is affixed onto the circuit board 30. Lower portions of the detectors 31 are electrically connected to the circuit board 30. In response to rotation of the rotating member 40, a series of light pulses are generated and received by the detectors 31. Thus, the rotational movement of the rotating member 40 can be converted to a digital signal representing the movement (i.e., a movement signal) by the light pulses. Further, pressing of the rotating member 40 will elastically deform the pad 310 and cause the pad 310 to press the push button 32. To the contrary, stopping the pressing of the pad 310 by the rotation of the rotating member 40 will release a stored elastic force of the pad 310 to return the pad 310 to its original shape and return the rotating member 40 to its original position. A control instruction is thus generated by the push button 32 in response to pressing the rotating member 40. Next, the movement signal and the pressing signal are converted respectively to be useable to move an object (e.g., cursor) 21 on a display 20 of the mobile communication device 1. As such, a user may conveniently, easily input a direction instruction as desired.

In the embodiment, the mobile communication device 1 is implemented as a mobile phone and the rotating member 40 is implemented as trackball. The object 21 shown on the display 20 is either a cursor or one of a plurality of icons. Referring to FIGS. 3 and 4 again, in the first preferred embodiment of the invention the hole 12 with the rotating member 40 fitted therein is provided on a top of the mobile communication device 1 proximate a lower end of the display 20 which is also provided on the top of the mobile communication device 1. In an operation of the mobile communication device 1 a user may use the index finger and the thumb to hold the mobile communication device 1. Also, the user may use the thumb to rotate the rotating member 40 to move the cursor toward a desired direction. The thumb then presses the rotating member 40 when the cursor moves to an icon to be selected. As a result, a pressing signal is generated and is capable of running a program representing the icon.

Figure 5:
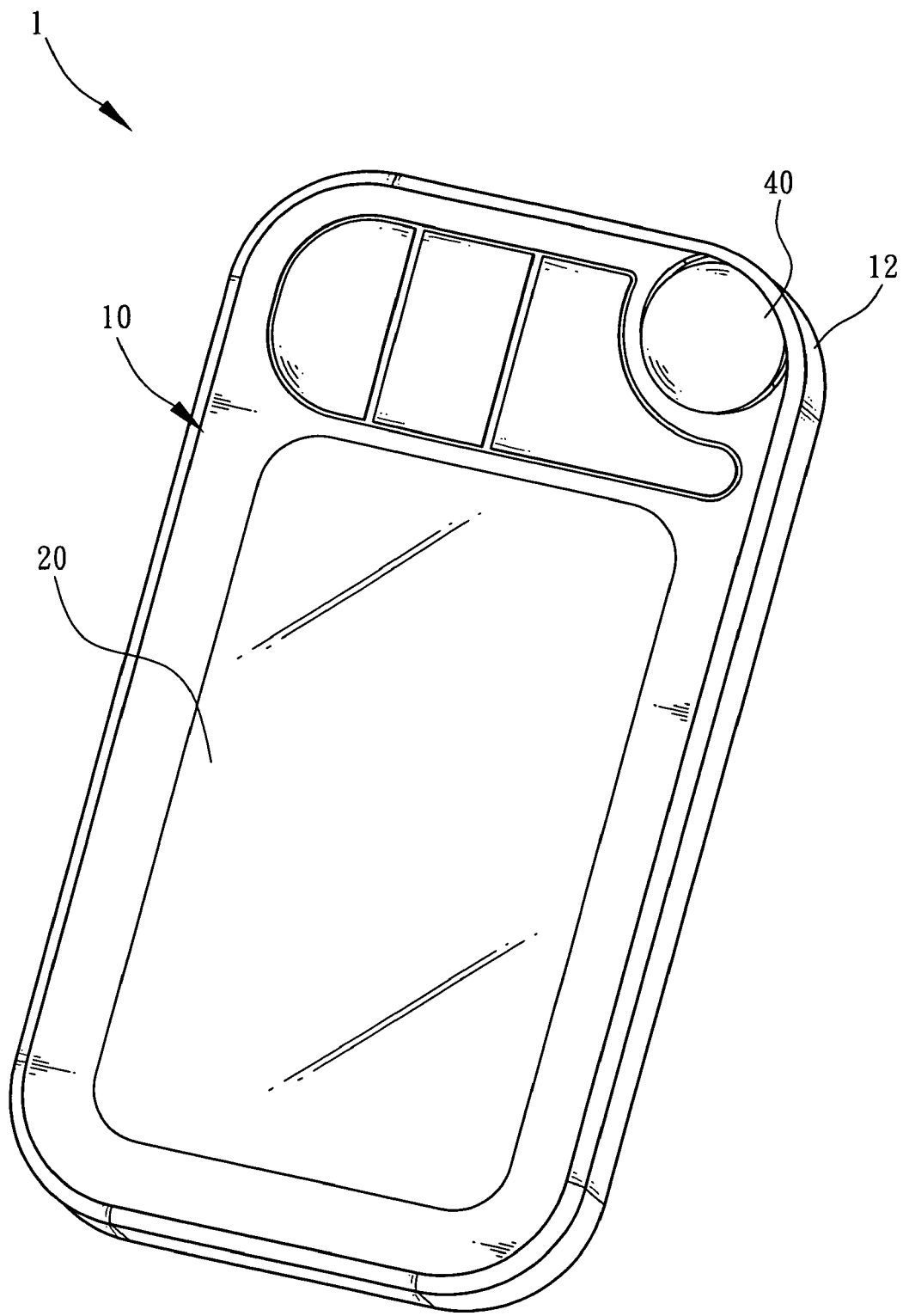
FIG. 5 is a perspective view of a second preferred embodiment of mobile communication device according to the invention.

Referring to FIG. 5, a second preferred embodiment of the invention is shown. The mobile communication device 1 is a rectangular body. The hole 12 with the rotating member 40 fitted therein is provided on a top corner of the mobile communication device 1 proximate the display 20 which is also provided on the top of the mobile communication device 1. In an operation of the mobile communication device 1 a user may use four fingers to hold the mobile communication device 1. Also, the user may use the thumb to rotate the rotating member 40 to move the cursor toward a desired direction. The thumb then presses the rotating member 40 when the cursor moves to an icon to be selected. As a result, a pressing signal is generated and is capable of running a program representing the icon.

Figure 6:
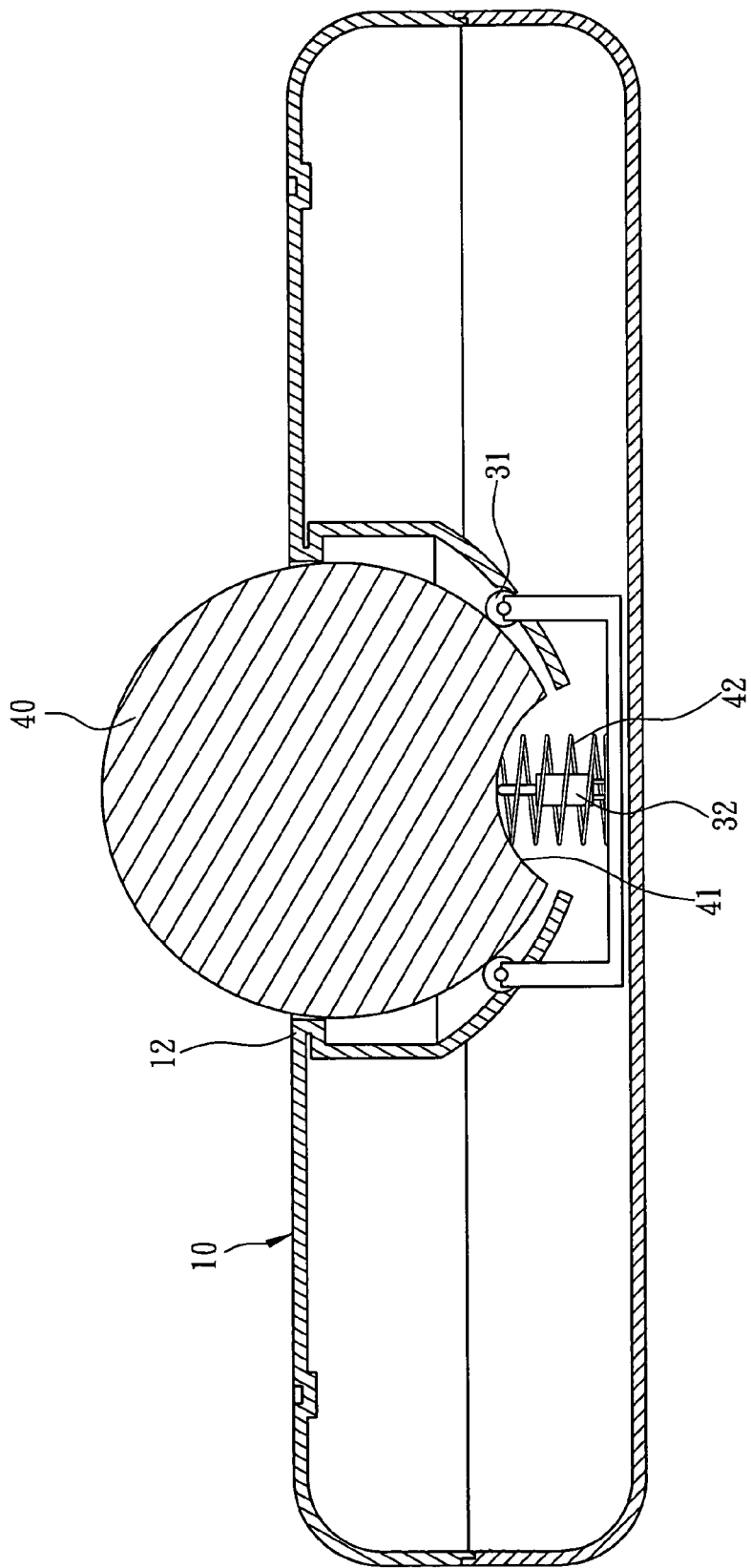
FIG. 6 is a sectional view of a rotating member and other adjacent components incorporated in a third preferred embodiment of mobile communication device according to the invention.

Referring to FIG. 6, a third preferred embodiment of the invention is shown. The rotating member (e.g., trackball) 40 has a recess 41 facing the push button 32. A portion of the push button 32 is extended into the recess 41 to urge against the rotating member 40. Thus, the rotating member 40 is only allowed to rotate a predetermined angle in any direction. Also, a resilient member (e.g., a coil spring) 42 is put on the push button 32. In response to rotating the rotating member 40, a portion of the resilient member 42 corresponding to the rotation direction is compressed. Stopping the rotation of the rotating member 40 will release stored elastic force of the resilient member 42 to return the rotating member 40 to its original position.

Dialing is provided on the display 20 by the mobile communication device 1 after rotating the rotating member 40 for a predetermined period of time. That is, the function of the keys of the mobile communication device 1 is replaced by the rotating member 40. In detail, a pressing signal is generated after pressing the push button 32 by the rotating member 40 for a predetermined period of time. A numeric keypad 22 for dialing is shown on the display 20 when the mobile communication device 1 is commanded by the pressing signal. As such, rotating the rotating member 40 will activate the dialing keypad 22 to dial.

As compared with the prior art, a cross-shaped key is replaced by the rotating member 40 as a direction control means according to the mobile communication device 1 of the invention. For example, a user may easily rotate the rotating member 40 to a desired direction (e.g., north east east of the display 20) rather than continuously pressing the cross-shaped key. The invention thus has many advantages including precisely moving a cursor to a desired position along a desired direction and thus saving time of adjusting direction of the cross-shaped key, and most importantly, relieving pain on the user's muscles due to a long time pressing of the cross-shaped key.

While the invention herein disclosed has been described by means of specific embodiments, numerous modifications and variations could be made thereto by those skilled in the art without departing from the scope and spirit of the invention set forth in the claims.

What is claimed is:

1. A mobile communication device comprising:
a rotating member;
a housing including a recessed hole having a circular opening on a surface of the housing, wherein the hole is dimensioned to fit the rotating member therein with a portion of the rotating member projected from the housing;
a circuit board provided within the housing and including one or more detectors provided in the hole of the housing facing the rotating member,
wherein portions of the detectors are in rotational contact with the rotating member, in response to rotating the rotating member a movement signal representing the rotational movement of the rotating member is generated by the detectors, and the movement signal is adapted to convert into an instruction useable to move an object on a top display of the mobile communication device;
a push button provided on the circuit board proximate a position to be in contact with the rotating member, whereby a pressing of the push button by the rotation of the rotating member will generate a pressing signal which is adapted to convert into a control instruction; and
a pad provided between the push button and the rotating member, wherein the pad has a top in contact with the rotating member and a bottom affixed onto the circuit board, in response to the rotation of the rotating member the pad is elastically deformed to press the push button, and stopping the pressing of the pad will release a stored elastic force of the pad to return the pad to its original shape and return the rotating member to its original position.

2. The mobile communication device of claim 1, wherein the hole with the rotating member fitted therein is provided on a top of the mobile communication device proximate a lower end of the display.

3. The mobile communication device of claim 2, wherein the rotating member comprises a recess facing the push button which has a portion extended into the recess to urge against the rotating member such that the rotating member is allowed to rotate a predetermined angle in any direction.

4. The mobile communication device of claim 3, further comprising a resilient member put on the push button, and wherein in response to rotating the rotating member, a portion of the resilient member corresponding to the rotation direction of the rotating member is compressed, and a stopping of the rotation will release a stored elastic force of the resilient member to return the rotating member to its original position.

5. The mobile communication device of claim 4, wherein a pressing signal is generated after pressing the push button by the rotating member for a predetermined period of time, and a numeric keypad for dialing is shown on the display when the mobile communication device is commanded by the pressing signal such that rotating the rotating member will activate the keypad to dial.

6. The mobile communication device of claim 1, wherein the mobile communication device is a rectangular body, and the hole with the rotating member fitted therein is provided on one of four corner on a top of the mobile communication device proximate the display.

7. The mobile communication device of claim 6, wherein the rotating member comprises a recess facing the push button which has a portion extended into the recess to urge against the rotating member such that the rotating member is allowed to rotate a predetermined angle in any direction.

8. The mobile communication device of claim 7, further comprising a resilient member put on the push button, and wherein in response to rotating the rotating member, a portion of the resilient member corresponding to the rotation direction of the rotating member is compressed, and a stopping of the rotation will release a stored elastic force of the resilient member to return the rotating member to its original position.

9. The mobile communication device of claim 8, wherein a pressing signal is generated after pressing the push button by the rotating member for a predetermined period of time, and a numeric keypad for dialing is shown on the display when the mobile communication device is commanded by the pressing signal such that rotating the rotating member will activate the keypad to dial.

* * * * *